United States Patent [19]

McCartney, Jr. et al.

[11] Patent Number: 4,743,270
[45] Date of Patent: May 10, 1988

[54] FILLING MAT-IMMOBILIZED-ELECTROLYTE BATTERIES

[75] Inventors: Charles P. McCartney, Jr., Yorktown; Robert L. Galyen, Jr., Anderson, both of Ind.

[73] Assignee: General Motors Corporation, Detroit, Mich.

[21] Appl. No.: 54,800

[22] Filed: May 27, 1987

[51] Int. Cl.$^4$ .......................................... H01M 10/16
[52] U.S. Cl. ..................................................... 29/623.1
[58] Field of Search .................. 29/623.1; 429/57–60; 204/2.1

[56] References Cited

U.S. PATENT DOCUMENTS 4,525,926  7/1985  Pearson .............................. 29/623.1

FOREIGN PATENT DOCUMENTS

| 59-151772 | 8/1984 | Japan | 29/623.1 |
| 60-07069 | 1/1985 | Japan | 29/623.1 |
| WO81/01076 | 4/1981 | PCT Int'l Appl. | 29/623.1 |
| 2129194 | 5/1984 | United Kingdom | 29/623.1 |

*Primary Examiner*—Aaron Weisstuch
*Attorney, Agent, or Firm*—Lawrence B. Plant

[57] ABSTRACT

The present invention comprehends a method of filling a mat-immobilized-electrolyte type, Pb-acid storage battery with electrolyte wherein a predetermined quantity of sulfuric acid sufficient to wet substantially the entire internal surface area of the mats and electrodes is metered into an empty cell container. Thereafter, an unformed cell element is inserted into the pre-filled container and therein progressively immersed into the acid at a sufficiently slow rate as to achieve substantial completion of the initial pickling reaction in the region of the electrode adjacent the front of electrolyte as it advances toward the top of the element. The immersion rate will preferably not be substantially greater than the rate at which the electrolyte wicks up into the mat so that the initial pickling reaction occurs essentially on either side of the wetted portion of the mat. Under these conditions, any gases generated during the initial pickling reaction, as well as any air in the mat, can freely vent from the element via the pores in the unimmersed portions of the mat. Such venting of the gases through the unimmersed portion of the mat and displacement thereof upwardly out of the element by the moving front of the electrolyte virtually eliminates the formation of pockets of gas or dilute electrolyte within the element.

4 Claims, No Drawings

FILLING MAT-IMMOBILIZED-ELECTROLYTE BATTERIES

This invention relates to filling mat-immobilized-electrolyte, Pb-acid electric storage batteries (e.g., gas-recombination batteries) with electrolyte.

BACKGROUND OF THE INVENTION

Mat-immobilized-electrolyte type, Pb-acid batteries include at least one galvanic cell element comprising opposite polarity electrodes (e.g., positive and negative plates) separated one from the other by a porous, absorbent mat (e.g., fibrous polypropylene, Dynel, glass, etc.). The mat is typically compressed between the electrodes and capillarily immobilizes the battery's electrolyte within the cell element. One such battery is described in U.S. Pat. No. 3,853,626 filed Dec. 20, 1968 in the names of Corbin et al and assigned to the assignee of the present invention.

Mat-immobilized-electrolyte batteries may be either of the "flooded" electrolyte type or "starved" electrolyte type. Flooded-electrolyte-type batteries have the mat and electrodes saturated with electrolyte in that the volume of the electrolyte substantially equals or exceeds the void volume of the pores within the mat and the electrodes. Starved-electrolyte-type batteries, on the other hand, have considerably less electrolyte volume than the void volume of the pores within the mat and the electrodes. So-called gas-recombinant batteries, for example, operate in a starved electrolyte condition wherein electrolyte volume is only about 80% to 85% of the available void volume within the mat and electrodes and thereby provide sufficient void space therein to permit migration of oxygen from the positive electrode directly to the negative electrode for consumption thereat.

Conventional (i.e., mat-free) lead-acid storage batteries are commonly manufactured by placing the cell elements in the battery container in the unformed (i.e., uncharged condition) state wherein the positive and negative electrodes both comprise essentially lead oxide. Thereafter $H_2SO_4$ forming acid is metered into the cell compartment atop the elements until the compartment is filled. The electrodes are subsequently electrolytically formed (i.e., initially charged) by passing a forming current therethrough. In some cases, the residual forming acid is then dumped and fresh acid substituted therefor as the working electrolyte. In other instances, the forming acid has sufficient residual strength to remain in the battery as the working electrolyte. Between the time the forming acid is added and the formation process begins, the sulfuric acid reacts exothermically with the lead oxide to form lead sulfate in both the positive and negative electrodes in a process often referred to as "pickling". The initial pickling reaction is quite vigorous and results in the generation of considerable heat and gas. The initial pickling reaction subsides considerably after about the first minute or so following acid addition as the acid weakens (i.e., becomes more dilute), the electrodes become sulfated and the lead oxide available for reaction decreases.

Electrolytic formation of the battery follows pickling and involves passing forming current through the battery to convert the lead sulfate in the electrodes to lead dioxide in the positive electrodes, lead in the negative electrodes and to reconstitute sulfuric acid in the electrolyte. The electrolytic formation process adds considerable heat to the battery thereby causing the temperature of the elements to increase significantly. High element temperatures during formation causes the gassing overvoltage of the electrodes to drop which in turn undesirably causes excessive gassing. Hence it is desirable to have the element temperature as low as possible at the beginning of formation so that undesirably high temperatures are not reached during formation. In mat-free batteries, the batteries can cool sufficiently by standing for about 30 to 60 minutes following pickling so as not to significantly affect gassing. Batteries containing glass mats however retain the heat for significantly longer periods of time.

In conventional, mat-free batteries excess gassing during formation, while undesirable, can nonetheless be tolerated as the gas can readily escape the element from between the plates. For mat-containing batteries, however, gassing during formation must be kept to a minimum in order to prevent any gas from becoming entrapped within the mat, causing so-called "dry spots" therein where little or no acid is present. In this regard, dry spots, whether formed during the pickling or formation reactions, will not only interfere with the formation reaction by causing incomplete formation in some regions of the electrodes and increased current densities in other regions thereof, but ultimately results in undesirable lead treeing (i.e., dendrite growth) between the plates, reduced battery capacity and cold cranking performance, as well as shortened cycle life.

Filling mat-immobilized-electrolyte type batteries with electrolyte by dispensing the electrolyte atop the cell element after the cell elements have been placed in their container can have a detrimental affect on the performance of the battery. In this regard, when so filled, the mats often: make it difficult to obtain uniform distribution of acid throughout the cell element; result in boiling of the electrolyte within the cell element during pickling; and/or result in mats containing pockets of trapped gases (i.e., dry spots). More specifically, without precautions (e.g., special container designs), electrolyte introduced into the container atop the cell element percolates down through the cell element from the top thereof, thereby trapping air within the element as well as preventing the ready escape of the gases and heat generated during the pickling reaction. As a result, not only are dry spots prevalent, but the temperature of the element is elevated to an undesirably high level and retains the heat for a prolonged period of time. Moreover, the concentration of the electrolyte within the cell element tends to vary from one location to the next. One reason for this is the stratification that occurs by virtue of the electrolyte front's descending down through the cell element. As the electrolyte front (i.e., the initial few centimeters of the electrolyte wave moving into the element) advances into the element, it is more rapidly depleted of its $H_2SO_4$ content then is the electrolyte tracking behind the front. As a result, by the time the liquid front reaches the bottom of the cell element, it has much lower sulfuric acid concentration than the acid near the top of the element. This concentration imbalance affects the conductivity of the electrolyte at different locations in the element, which in turn affects current density distribution, dendrite formation and corrosion rate of the electrode's supporting grid structure in those regions of the element where the electrolyte is more dilute. Another reason for electrolyte concentration variations is the formation of dry spots (i.e., trapped gases) discussed above. Eventually, acid will infiltrate even into the dry spots, at least to some extent, but is quickly consumed by the unformed PbO in the regions of the electrodes adjacent the dry spots, resulting in pockets of low concentration acid within the element. Finally, because mat-immobilized electrolyte elements do not take up electrolyte as quickly as mat-free elements, care must be taken to meter the electrolyte into the container atop the element at a sufficiently slow rate as to preclude overflow thereof from the top of the container above the cell element.

OBJECT OF THE INVENTION

It is an object of the present invention to provide a unique, simple and effective method of filling mat-immobilized-electrolyte, lead-acid storage batteries with electrolyte so as (1) to substantially avoid the entrapment of air and pickling gases within a cell element during filling, and (2) to dissipate the heat generated therein during pickling. This and other objects and advantages of the present invention will become readily apparent from the detailed description thereof which follows.

SUMMARY OF THE INVENTION

The present invention comprehends a method of filling a mat-immobilized-electrolyte type, Pb-acid storage battery with electrolyte wherein a predetermined quantity of sulfuric acid sufficient to wet substantially the entire internal surface area of the mats and electrodes is metered into an empty cell container. Thereafter, an unformed cell element is inserted into the prefilled container and therein progressively immersed into the acid at a sufficiently slow rate as to achieve substantial completion of the initial pickling reaction in the region of the electrode adjacent the front of electrolyte as it advances toward the top of the element. The immersion rate will preferably not be substantially greater than the rate at which the electrolyte wicks up into the mat so that the initial pickling reaction occurs essentially on either side of the wetted portion of the mat. Under these conditions, any gases generated during the initial pickling reaction, as well as any air in the mat, can freely vent from the element via the pores in the unimmersed portions of the mat. Such venting of the gases through the unimmersed portion of the mat and displacement thereof upwardly out of the element by the moving front of the electrolyte virtually eliminates the formation of pockets of gas or dilute electrolyte within the element.

Filling mat-immobilized batteries according to the present invention also results in a much cooler cell element at the commencement of formation (i.e., for a given stand time) than similar batteries filled such that the acid percolates down through the element. In this regard, immersing the element into the acid permits the heat generated by the initial pickling reaction to be readily removed from the cell element primarily by the cooling effect of the electrolyte front as it moves through the element and carries the heat from the innards of the element to the top thereof where it can be readily dissipated. The relatively high heat capacity of the electrolyte (i.e., about four times that of the electrodes) causes the electrolyte front to act like a heat sink which absorbs the heat from the electrodes as it moves past the reaction zone toward the top of the element. Batteries so filled can cool sufficiently to commence formation in less time than mat-immobilized-electrolyte-type batteries filled from the top.

The cell element may be progressively immersed into the electrolyte in a substantially continuous manner or via a series of incremental steps. The rate of immersion, or the size and number of incremental steps, will vary from battery to battery depending on the concentration and temperature of the electrolyte as well as the internal surface area (i.e., fiber size and distribution) and apparent density of the mat, all of which affect the rate at which the element will wick electrolyte thereinto. Tests have been conducted with: (1) mats ranging from about 0.15 to 0.35 g/cm$^3$ apparent density (0.020″–0.050″ mat compression); acid specific gravities from 1.2 to 1.3 g/cm$^3$; and acid temperatures varying from 40° F. to 80° F. These tests shows that the wicking rate can vary anywhere from about 250 secs to about 800 secs for an element to wick acid to a height of 10 cms (i.e., from the bottom) when the bottom of the element is immersed 1 cm in the acid. Generally higher apparent mat densities (i.e., greater compression), higher acid concentration and higher acid temperatures slows the wicking rate. Moreover, it was observed that the higher apparent mat densities result in lower element temperatures (i.e., as much as 20° F. lower) at the end of pickling while the more concentrated acids yield higher element temperatures at the end of pickling (i.e., as much as 35° F. higher for 1.3 s.g. acid compared to 1.25 s.g. acid). At no time did the temperature of the cell elements exceed 195° F. when filled in accordance with the present invention. It is noted that as the acid wicks up the element, the combination of the pickling heat generated and the reaction of the acid with the plate materials lowers both the viscosity and density of the acid as it moves into the element. Hence, depending on the conditions, immersion rates varying from about 0.7 cm/min. up to about 2.2 cm/min. will be used with the present invention.

SPECIFIC EXAMPLES

The aforesaid tests were conducted using a 13 plate cell element wherein each of the six (6) negative plates was wrapped with the glass mat being tested and the element compressed as required by the tests. The element was immersed to a depth of 1 cm in H$_2$SO$_4$ at the desired concentration and temperature. The time to wick up 10 cm's from the bottom of the element was recorded. Maximum element temperature was recorded from a thermocouple placed essentially midway between the side edges of the center-most plate of the element and 2.5 cm below the top edge thereof. The maximum temperature recorded is the highest temperature occurring at the thermocouple during the immersion process but does not reflect the final temperature at the end of immersion. In this regard, eventually the rising acid contacts and cools the thermocouple as the heat is pushed out the top of the element as the acid front moves in that direction.

While this invention has been disclosed primarily in terms of a specific embodiment thereof it is not intended to be limited thereto but rather only to the extent set forth hereafter in the claims which follows.

The embodiments of the invention in which an exclusive property or privilege is claimed are defined as follows:

1. In a method of assembling a mat-immobilized-electrolyte Pb-acid storage battery comprising the principal steps of assembling a galvanic cell element stack containing a compressible, absorbent mat sandwiched between positive and negative polarity electrodes, compressing said element so as to compress said mat to a predetermined thickness, inserting said compressed element into a container, and impregnating said element with a predetermined quantity of sulfuric acid sufficient to coat substantially the entire surface area of said mat and said electrodes, the improvement comprising:

dispensing said predetermined quantity of acid into said container prior to said inserting of said element; and thereafter inserting said element into said container and therein progressively immersing said element in said acid at a sufficiently slow rate as to cause the initial pickling reaction to occur substantially in the region of the electrolyte front wicking into the element and such that the gases generated during pickling are vented through the as-yet unimmersed portions of the mat and the heat generated during pickling is carried to the top of the element by the electrolyte advancing upwardly therethrough for ready dissipation from atop thereof.

2. A method according to claim 1 wherein said element is immersed in said acid in a series of incremental steps.

3. In a method of assembling a mat-immobilized-electrolyte type Pb-acid storage battery comprising the principal steps of assembling a galvanic cell element stack containing a plurality of compressible, fibrous, absorbent mats interleaved between a plurality of alternating positive and negative polarity plates, compressing said stack so as to compress said mats to a predetermined thickness, inserting said compressed stack into an appropriate container, and impregnating said stack with a predetermined quantity of sulfuric acid sufficient to coat substantially the entire surface area of said mat and said plates, the improvement comprising:

dispensing said predetermined quantity of acid into said container prior to said inserting of said stack; and thereafter inserting said stack into said container and therein immersing said stack in said acid so as to progressively imbibe said acid into said mat and plates at a rate not substantially greater than the rate at which said electrolyte wicks into said mat.

4. In a method of assembling a mat-immobilized-electrolyte Pb-acid storage battery comprising the principal steps of assembling a galvanic cell element stack containing a compressible, fibrous, absorbent mat sandwiched between positive and negative polarity electrodes, compressing said element so as to compress said mat to a predetermined thickness, inserting said compressed element into a container, and impregnating said element with a predetermined quantity of sulfuric acid sufficient to coat substantially the entire surface area of said mat and said electrodes, the improvement comprising:

dispensing said predetermined quantity of acid into said container prior to said inserting of said element; and thereafter inserting said element into said container and therein immersing said element in said acid at a rate not substantially greater than the wicking rate of said electrolyte into said mat;

whereby (1) the gases initially generated during pickling of the plates are readily vented through the as-yet unimmersed portions of the mat, (2) element temperature rise during pickling is kept to a minimum, and (3) pockets of low gravity acid within the mat and electrodes are substantially eliminated.

* * * * *